US010379697B2

(12) United States Patent
Petersen et al.

(10) Patent No.: US 10,379,697 B2
(45) Date of Patent: *Aug. 13, 2019

(54) ADJUSTING INFORMATION DEPTH BASED ON USER'S ATTENTION

(71) Applicant: Google Inc., Mountain View, CA (US)

(72) Inventors: Morten Just Petersen, San Francisco, CA (US); Emmet Connolly, Mountain View, CA (US); Matias Gonzalo Duarte, Mountain View, CA (US); Alexander Faaborg, Mountain View, CA (US)

(73) Assignee: Google LLC, Mountain View, CA (US)

( * ) Notice: Subject to any disclaimer, the term of this patent is extended or adjusted under 35 U.S.C. 154(b) by 301 days.

This patent is subject to a terminal disclaimer.

(21) Appl. No.: 15/469,357

(22) Filed: Mar. 24, 2017

(65) Prior Publication Data

US 2017/0199568 A1   Jul. 13, 2017

Related U.S. Application Data

(63) Continuation of application No. 14/216,371, filed on Mar. 17, 2014, now Pat. No. 9,639,231.

(51) Int. Cl.
  *G06F 3/0482* (2013.01)
  *G06F 3/0481* (2013.01)
  (Continued)

(52) U.S. Cl.
  CPC ........... *G06F 3/0481* (2013.01); *G01C 21/20* (2013.01); *G06F 3/013* (2013.01); *G06F 3/014* (2013.01);
  (Continued)

(58) Field of Classification Search
  CPC ........ G06F 3/0481; G06F 3/013; G06F 3/014; G06F 3/017; G06F 3/0484; G06F 9/4443;
  (Continued)

(56) References Cited

U.S. PATENT DOCUMENTS 5,617,526 A    4/1997   Oran et al.
5,859,640 A    1/1999   de Judicibus
             (Continued)

FOREIGN PATENT DOCUMENTS

CN    102985897 A    3/2013
CN    103472913 A    12/2013
EP      1947559 A1    7/2008

OTHER PUBLICATIONS

Translation of the Notification for Patent Registration from counterpart Chinese Application No. 201580013741.6, dated Oct. 18, 2018, 9 pp.

(Continued)

*Primary Examiner* — Anil K Bhargava
(74) *Attorney, Agent, or Firm* — Shumaker & Sieffert, P.A.

(57) ABSTRACT

A computing device is described that includes one or more processors and at least one module operable by the processors to output, for display, first information for an event, and, responsive to determining that a user of the computing device has viewed a display device of the computing device for at least a threshold amount of time, output, for display, second information for the event, the second information including information associated with the event and not included in the first information. The module is further operable to, responsive to determining that the user of the computing device has viewed the display device for at least another threshold amount of time greater than the first threshold amount of time, output, for display, third information for the event, the third information including additional information associated with the event and not included in the first information or the second information.

18 Claims, 6 Drawing Sheets

(51) Int. Cl.
  *G06F 3/01* (2006.01)
  *G06F 3/0484* (2013.01)
  *G06F 3/0485* (2013.01)
  *H04M 1/725* (2006.01)
  *G01C 21/20* (2006.01)
  *G06F 3/16* (2006.01)
  *G10L 15/26* (2006.01)
  *H04M 1/57* (2006.01)
  *H04M 3/533* (2006.01)

(52) U.S. Cl.
  CPC ............ *G06F 3/017* (2013.01); *G06F 3/0482* (2013.01); *G06F 3/0484* (2013.01); *G06F 3/0485* (2013.01); *G06F 3/167* (2013.01); *G10L 15/26* (2013.01); *H04M 1/576* (2013.01); *H04M 1/72544* (2013.01); *H04M 1/72547* (2013.01); *H04M 1/72569* (2013.01); *H04M 3/53358* (2013.01); *G06F 2203/04806* (2013.01); *H04M 2203/2066* (2013.01); *H04M 2203/2072* (2013.01); *H04M 2250/12* (2013.01)

(58) Field of Classification Search
  CPC ........ G06F 3/0485; G06F 2203/04846; H04M 1/72544
  See application file for complete search history.

(56) References Cited

U.S. PATENT DOCUMENTS

| | | | |
|---|---|---|---|
| 5,910,802 A | 6/1999 | Shields et al. | |
| 5,995,101 A * | 11/1999 | Clark | G06F 3/04895 715/711 |
| 6,342,908 B1 | 1/2002 | Bates et al. | |
| 6,459,440 B1 | 10/2002 | Monnes et al. | |
| 6,477,117 B1 * | 11/2002 | Narayanaswami | G04G 13/026 368/224 |
| 6,538,660 B1 | 3/2003 | Celi, Jr. et al. | |
| 6,563,514 B1 | 5/2003 | Samar | |
| 6,577,329 B1 * | 6/2003 | Flickner | G06F 3/013 715/774 |
| 6,618,716 B1 | 9/2003 | Horvitz | |
| 6,873,314 B1 * | 3/2005 | Campbell | A61B 3/113 345/156 |
| 6,954,905 B2 | 10/2005 | Brown et al. | |
| 7,019,757 B2 | 3/2006 | Brown et al. | |
| 7,046,254 B2 | 5/2006 | Brown et al. | |
| 7,120,865 B1 | 10/2006 | Horvitz et al. | |
| 7,146,573 B2 | 12/2006 | Brown et al. | |
| 7,155,729 B1 | 12/2006 | Andrew et al. | |
| 7,243,130 B2 | 7/2007 | Horvitz et al. | |
| 7,249,326 B2 | 7/2007 | Stoakley et al. | |
| 7,250,955 B1 | 7/2007 | Beeman et al. | |
| 7,417,650 B1 | 8/2008 | Horvitz | |
| 7,475,348 B2 | 1/2009 | Lin et al. | |
| 7,620,905 B2 | 11/2009 | Boss et al. | |
| 7,711,806 B1 | 5/2010 | Roka et al. | |
| 7,743,340 B2 | 6/2010 | Horvitz et al. | |
| 7,844,666 B2 | 11/2010 | Horvitz et al. | |
| 7,996,045 B1 | 8/2011 | Bauer et al. | |
| 8,019,834 B2 | 9/2011 | Horvitz et al. | |
| 8,086,672 B2 | 12/2011 | Horvitz | |
| 8,160,900 B2 | 4/2012 | Taub et al. | |
| 8,266,612 B2 | 9/2012 | Rathi et al. | |
| 8,542,675 B2 | 9/2013 | Cormier et al. | |
| 8,548,431 B2 | 10/2013 | Teng et al. | |
| 8,631,419 B2 | 1/2014 | Horvitz et al. | |
| 8,723,823 B2 | 5/2014 | Shia et al. | |
| 8,738,972 B1 | 5/2014 | Bakman et al. | |
| 8,751,500 B2 | 6/2014 | Duarte et al. | |
| 8,839,142 B2 | 9/2014 | Chaudhri et al. | |
| 8,892,674 B2 | 11/2014 | Horvitz | |
| 8,893,033 B2 | 11/2014 | Donahue et al. | |
| 8,972,892 B2 | 3/2015 | Schuller et al. | |
| 9,015,641 B2 | 4/2015 | Bocking et al. | |
| 9,043,715 B2 | 5/2015 | Nolterieke et al. | |
| 9,118,614 B1 | 8/2015 | Rogers et al. | |
| 9,154,606 B2 | 10/2015 | Tseng et al. | |
| 9,218,593 B2 | 12/2015 | Kim | |
| 9,282,587 B2 | 3/2016 | Winkler | |
| 9,406,103 B1 | 8/2016 | Gray et al. | |
| 9,448,685 B1 | 9/2016 | Somin et al. | |
| 9,519,417 B2 | 12/2016 | Logan | |
| 2002/0054117 A1 | 5/2002 | van Dantzich et al. | |
| 2002/0080156 A1 | 6/2002 | Abbott et al. | |
| 2002/0161634 A1 | 10/2002 | Kaars | |
| 2004/0059790 A1 | 3/2004 | Austin-Lane et al. | |
| 2004/0061716 A1 | 4/2004 | Cheung et al. | |
| 2004/0225718 A1 | 11/2004 | Heinzel et al. | |
| 2005/0044500 A1 | 2/2005 | Orimoto et al. | |
| 2005/0120306 A1 | 6/2005 | Klassen et al. | |
| 2006/0093998 A1 | 5/2006 | Vertegaal | |
| 2007/0044086 A1 | 2/2007 | Sampath | |
| 2007/0067734 A1 | 3/2007 | Cunningham et al. | |
| 2009/0113298 A1 * | 4/2009 | Jung | G06F 3/011 715/700 |
| 2009/0219166 A1 | 9/2009 | MacFarlane et al. | |
| 2009/0249247 A1 | 10/2009 | Tseng et al. | |
| 2009/0252311 A1 * | 10/2009 | Kuiken | G08C 17/00 379/102.02 |
| 2010/0094681 A1 * | 4/2010 | Almen | G06F 3/013 705/7.29 |
| 2011/0004845 A1 | 1/2011 | Ciabarra | |
| 2011/0106736 A1 | 5/2011 | Aharonson et al. | |
| 2011/0261079 A1 * | 10/2011 | Ingrassia, Jr. | A63B 24/0062 345/665 |
| 2012/0102409 A1 * | 4/2012 | Fan | H04W 4/00 715/738 |
| 2012/0131519 A1 * | 5/2012 | Jitkoff | G06F 3/0481 715/863 |
| 2012/0194976 A1 * | 8/2012 | Golko | G06F 1/163 361/679.01 |
| 2012/0229909 A1 * | 9/2012 | Clavin | G02B 27/017 359/630 |
| 2012/0258691 A1 | 10/2012 | Baer et al. | |
| 2012/0290109 A1 * | 11/2012 | Engelberg | G06F 19/3481 700/91 |
| 2013/0145303 A1 * | 6/2013 | Prakash | G06F 3/04883 715/779 |
| 2013/0222154 A1 | 8/2013 | Mori et al. | |
| 2013/0234924 A1 * | 9/2013 | Janefalkar | G06F 1/1694 345/156 |
| 2013/0331067 A1 | 12/2013 | Coussemaeker et al. | |
| 2013/0346408 A1 | 12/2013 | Duarte et al. | |
| 2013/0346882 A1 | 12/2013 | Shiplacoff et al. | |
| 2013/0346922 A1 * | 12/2013 | Shiplacoff | G06F 3/04842 715/835 |
| 2014/0013196 A1 | 1/2014 | White | |
| 2014/0032259 A1 * | 1/2014 | LaFever | G06Q 30/0201 705/7.29 |
| 2014/0068494 A1 | 3/2014 | Petersen et al. | |
| 2014/0195918 A1 * | 7/2014 | Friedlander | G06F 3/04842 715/727 |
| 2014/0232645 A1 * | 8/2014 | Ali | G02B 27/0176 345/156 |
| 2014/0249429 A1 * | 9/2014 | Tran | A61B 5/0022 600/483 |
| 2015/0111558 A1 * | 4/2015 | Yang | G04G 21/04 455/418 |
| 2015/0160622 A1 * | 6/2015 | Kim | G04G 21/02 368/9 |
| 2015/0205465 A1 | 7/2015 | Robison et al. | |
| 2015/0261387 A1 | 9/2015 | Petersen et al. | |

OTHER PUBLICATIONS

Prosecution History from U.S. Appl. No. 14/216,371, dated Nov. 18, 2014 through Dec. 23, 2016, 187 pp.

(56) References Cited

OTHER PUBLICATIONS

Notice of Intent to Grant and Text Intended to Grant from counterpart European Application No. 15706630.9, dated Feb. 27, 2018, 52 pp.

First Office Action and Search Report, and translation thereof, from counterpart Chinese Application No. 201580013741.6, dated Jun. 11, 2018, 12 pp.

\* cited by examiner

ADJUSTING INFORMATION DEPTH BASED ON USER'S ATTENTION

RELATED APPLICATION

This application is a Continuation of U.S. application Ser. No. 14/216,371, filed Mar. 17, 2014, the entire contents of which is hereby incorporated by reference.

BACKGROUND

Mobile computing devices allow a user to perform a variety of functions, including various forms of communication and computing. For example, mobile computing devices may be capable of accessing the Internet, executing gaming applications, playing media, receiving messages, as well as providing functionality of a traditional cellular telephone. In some examples, a mobile computing device may output, for display, notifications of various events (e.g., an upcoming appointment, an incoming communication, etc.). The amount of information that can be consumed by a user may vary based on what the user is currently doing. However, such notifications typically include the same set of information, regardless of the activity in which the user is currently engaged.

SUMMARY

In one example, a method includes outputting, by a computing device and for display, first information for an event, and, responsive to determining that a user of the computing device is viewing a display device of the computing device for a first threshold amount of time, outputting, by the computing device and for display, second information for the event, the second information including information associated with the event and not included in the first information. The method further includes, responsive to determining that the user of the computing device is viewing the display device for a second threshold amount of time that is greater than the first threshold amount of time, outputting, by the computing device and for display, third information for the event, the third information including additional information associated with the event and not included in either the first information or the second information.

In another example, a computing device includes one or more processors and at least one module operable by the one or more processors to output, for display, first information for an event, and, responsive to determining that a user of the computing device is viewing a display device of the computing device for a first threshold amount of time, output, for display, second information for the event, the second information including information associated with the event and not included in the first information. The at least one module is further operable by the one or more processors to, responsive to determining that the user of the computing device is viewing the display device for a second threshold amount of time that is greater than the first threshold amount of time, output, for display, third information for the event, the third information including additional information associated with the event and not included in either the first information or the second information.

In an additional example, a computer-readable storage medium comprising instructions that, when executed, configure one or more processors of a computing system to output, for display, first information for an event, and, responsive to determining that a user of the computing device is viewing a display device of the computing device for a first threshold amount of time, output, for display, second information for the event, the second information including information associated with the event and not included in the first information. The instructions, when executed, further configure the one or more processors of the computing system to, if the computing device is currently designated to responsive to determining that the user of the computing device is viewing the display device for a second threshold amount of time that is greater than the first threshold amount of time, output, for display, third information for the event, the third information including additional information associated with the event and not included in either the first information or the second information.

The details of one or more examples of the disclosure are set forth in the accompanying drawings and the description below. Other features, objects, and advantages will be apparent from the description and drawings, and from the claims.

DETAILED DESCRIPTION

Figure 1:
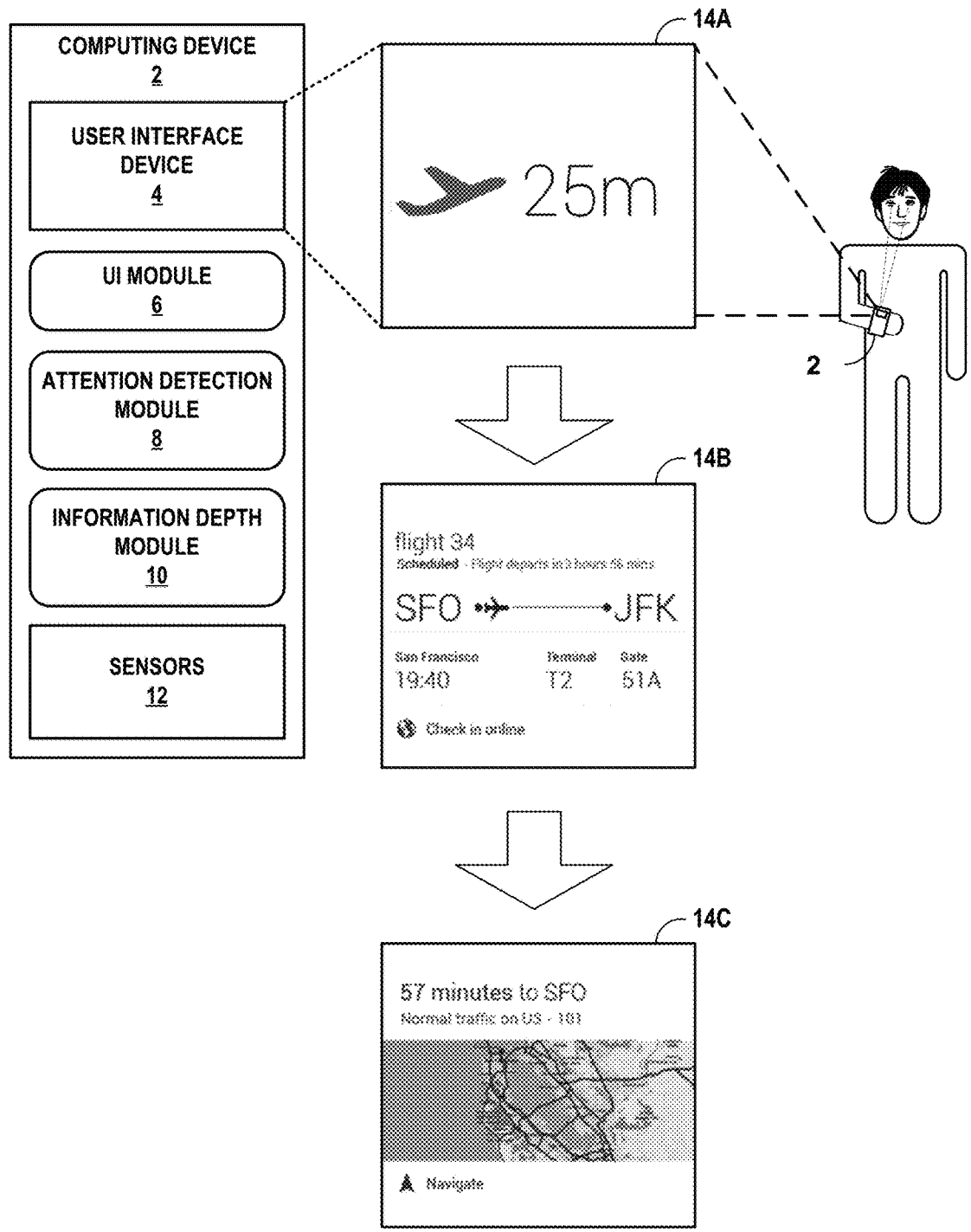
FIG. 1 is a block diagram illustrating an example system for adjusting the depth of information displayed, in accordance with one or more techniques of the present disclosure.

Techniques according to the disclosure may enable a computing device to adapt, based on a user's current attention capacity, an amount of information conveyed by a notification output by the computing device. For example, the computing device may initially determine that the user is not currently paying attention to the computing device and, based on that determination, output a notification that includes a relatively small amount of information. The initially displayed information may include, for example, an icon indicating a person associated with the notification and/or an icon indicating a subject of the notification or of content associated with the notification. If the computing device determines that the user has viewed the initial information and is continuing to look at or otherwise interact with the computing device, the computing device may use this determination as an indication that the user would like more information about the subject (e.g., an event) associated with the notification. Responsive to determining that the user is continuing to interact with the computing device, the computing device may modify or enhance the notification to, for example, output additional information about the subject. If the user continues to pay attention to the computing device, the computing device may continue to update the information displayed with additional information about the subject with which the notification is associated. In this manner, techniques of this disclosure may enable a computing device to dynamically adapt the amount of information being conveyed by a notification according to a determined indication of an amount of attention a user is currently providing to the computing device.

Throughout the disclosure, examples are described in which a computing device and/or a computing system may analyze information (e.g., locations, speeds, etc.) associated with a computing device only if the computing device receives permission from the user to analyze the information. For example, in situations discussed below in which the computing device may collect or may make use of information associated with the user, the user may be provided with an opportunity to provide input to control whether programs or features of the computing device can collect and make use of user information (e.g., information about a user's current location, current speed, etc.), or to dictate whether and/or how to the computing device may receive content that may be relevant to the user. In addition, certain data may be treated in one or more ways before it is stored or used by the computing device and/or computing system, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device.

FIG. 1 is a block diagram illustrating an example computing device for adjusting the depth of information displayed, in accordance with one or more techniques of the present disclosure. As shown in the example of FIG. 1, computing device 2 includes user interface device 4, user interface ("UI") module 6, information depth module 8, and sensors 10.

In the example of FIG. 1, computing device 2 is a wearable computing (e.g., a computerized watch, computerized eyewear, computerized gloves, etc.). However, in other examples, computing device 2 may be a tablet computer, mobile phone, personal digital assistant (PDA), laptop computer, gaming system, media player, e-book reader, television platform, automobile navigation system, or any other types of mobile and/or non-mobile computing device that is configured to output notification information in accordance with techniques of this disclosure.

User interface device (UID) 4 of computing device 2 may function as respective input and/or output devices for computing device 2. UID 4 may be implemented using various technologies. For instance, UID 4 may function as an input device using a presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 4 may function as an output (e.g., display) device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 2. In some examples, the display devices can be physically separate from a presence-sensitive device included in computing device 2.

UID 4 may include a presence-sensitive display that may receive tactile input from a user of computing device 2. UID 4 may receive indications of tactile input by detecting one or more gestures from a user (e.g., the user touching or pointing to one or more locations of UID 4 with a finger or a stylus pen). UID 4 may present output to a user, for instance at respective presence-sensitive displays. UID 4 may present the output as respective graphical user interfaces (e.g., user interfaces 14A-14N), which may be associated with functionality provided by computing device 2. For example, UID 4 may present various user interfaces related to the functionality of computing platforms, operating systems, applications, and/or services executing at or accessible by computing device 2 (e.g., electronic message applications, Internet browser applications, mobile or desktop operating systems, etc.). A user may interact with a user interface to cause computing device 2 to perform respective operations relating to functions.

Computing device 2 may include a user interface ("UI") module 6, attention detection module 8, and information depth module 10. Modules 6, 8, and 10 may perform operations described using software, hardware, firmware, or a mixture of hardware, software, and firmware residing in and/or executing at respective computing device 2. Computing device 2 may each execute respective modules 6, 8, and 10 with one or more processors. Computing device 2 may execute respective modules 6, 8, and 10 as one or more virtual machines executing on underlying hardware of computing device 2. Modules 6, 8, and 10 may execute as one or more services or components of operating systems or computing platforms of computing device 2. Modules 6, 8, and 10 may execute as one or more executable programs at application layers of computing platforms of computing device 2. UID 4 and modules 6, 8, and 10 may be otherwise arranged remotely to and remotely accessible to respective computing device 2, for instance, as one or more network services operating in a network cloud.

Rather than outputting, for display, a notification having a fixed portion of information associated with a subject of the notification (e.g., an event), techniques of this disclosure may enable computing device 2 to automatically adjust the amount and/or depth of information conveyed by the notification based on a determined indication of an amount of attention a user is paying to computing device 2. In some examples, computing device 2 may extract important information associated with the event and output an initial visual rendering of the important information. If computing device 2 (e.g., using attention detection module 8) determines that a user of computing device 2 is paying attention to computing device 2 (e.g., UID 4, interacting with computing device 2, etc.), computing device 2 may output additional information.

As one example, computing device 2 may receive an indication of an event (e.g., an indication of upcoming travel plans including an upcoming flight). In general, an event, as used in this disclosure, may include any incoming communication, such as an email, text message, phone call, etc., an upcoming calendar appointment, system alert, reminder, departure time, upcoming travel information, traffic information, concert information, movie information, or any other activity. The indication of the event may include content, such as a sender, recipient, subject, text, images, video, audio, and other information of an incoming communication, travel time information, flight information, ticketing information, location information, etc. In some instances the event is determined (e.g., by a predictive knowledge service) based on one or more prior messages received by or sent by a user associated with computing device 2 (e.g., based on a flight confirmation email, a dinner invitation text message, an electronic receipt, a voicemail message, etc.).

Computing device 2 may receive the indication of the event from a remote server system (e.g., a cloud service, an email service, a predictive knowledge service, etc.) or the indication may be generated by an application, operating system, or other element of computing device 2 and an element, such as information depth module 10, may receive the indication of the event from the other element of computing device 2. When describing computing device 2 or another computing device as receiving an indication of the event, both examples are contemplated.

In situations in which the systems discussed herein, such as information depth module 10, may collect personal information about the user, or may make use of the user's personal information, the user may be provided with an opportunity to control whether, and to what extent, programs or features collect the user's information (e.g., information about the user's social network, social actions or activities, profession, the user's preferences, or the user's current location), or to control whether and/or how to receive content from the content server that may be more relevant to the user. In addition, certain data may be treated in one or more ways before it is stored or used, so that personally identifiable information is removed. For example, the user's identity may be treated so that no personally identifiable information can be determined for the user, or the user's geographic location may be generalized where location information is obtained (such as to a city, ZIP code, or state level), so that a particular location of the user cannot be determined. Thus, the user may have control over how information is collected about the user and used by a content server.

Information depth module 10 may analyze the indication of the event (e.g., an upcoming flight) and determine different amounts and/or levels of detail of content (e.g., various "depths" of information) associated with the event to be presented or otherwise output for display by computing device 2. In general, information depth module 10 may identify one or more people, businesses, or other entities associated with the event, identify an activity associated with the event, identify a location associated with the event, identify date and time associated with the event, etc. For example, information depth module 10 may identify departure information for the flight (e.g., a departure date, time, airport, terminal, gate, etc.), an airline associated with the flight, traffic conditions between the current location of the user associated with computing device 2 and the departure airport, etc.

Using the identified information, information depth module 10 may determine relative importance of various portions of the information and provide an indication of the particular information and/or of a visual rendering of the most important information associated with the event to UI module 6. For example, information depth module 10 may determine that the most important information relating to the upcoming flight is the fact that the upcoming event is a flight and an amount of time until the user needs to depart for the airport in order to catch the flight. Information depth module 10 may determine that the next most important information may be the details of the flight, including the departure time, flight number, terminal and gate information, etc. and that the traffic conditions between the current location of the user and the airport may be the least important information.

Alternatively, or in addition, information depth module 10 may rank the information based on the level of detail of the information or a determined level of attention the user needs to provide to computing device 2 in order to comprehend the information. For example, information depth module 10 may determine that traffic information is more important the details of the flight, however, that the user needs to give computing device 2 more attention to comprehend the traffic information than to comprehend the flight details.

In some examples, the relative importance of the information may change based on a location of computing device 2. For example, prior to the user departing for the airport, information depth module 10 may determine that the traffic information is more important than the flight information. However, when the user nears the airport, information depth module 10 may determine that the flight details or parking information are more important than the traffic information.

In general, information depth module 10 may provide an indication of the information to display to UI module 6. UI module 6 may cause UID 4 to output a GUI (e.g., GUI 14A) that includes a visual rendering of the important information. In some examples, the visual rendering may include an image or other visual depiction of a person, group, or other entity associated with the event and an image or other visual depiction of a subject of the event. In some examples, the visual rendering may include an amount of time until the user needs to depart for the event, an amount of time until the event starts, an estimated travel time to reach a location associated with the event, etc. As shown in FIG. 1, GUI 14A includes a graphic of an airplane and the text "25 m" to indicate that the user has an upcoming flight and needs to leave in 25 minutes in order to catch the flight.

Attention detection module 8 may determine whether or not the user is interaction with or otherwise paying attention to computing device 2. In some examples, attention detection module 8 may receive information from one or more input devices (e.g., cameras, microphones, presence-sensitive input devices, etc.), from sensors 12 (e.g., accelerometer, gyroscope, compass, etc.), from an operating system executing at computing device 2, and from other software and/or hardware modules of computing device 2. Using the received information, attention detection module 8 may determine whether a user is interaction with or otherwise paying attention to computing device 2. That is, attention detection module 8 may determine whether the user is likely viewing UID 4 of computing device 2.

In instances where attention detection module 8 determines that the user is not likely viewing UID 4, attention detection module 8 may provide indication that user is likely not viewing UID 4 to information depth module 10. Information depth module 10 may determine, based on the indication received from attention detection module 8, that no additional information associated with the event should be output at the current time. In some examples, information depth module 10 may send a message to UI module 6 to cause UID 4 to cease outputting GUI 14A. In various examples, UI module 6 may automatically cause UID 4 to cease outputting GUI 14A in response to a period of time elapsing. In some instances, UI module 6 may cause UI device 14A to cease outputting GUI 14A in response to failing to receive, within a threshold amount of time after receiving the indication of the information currently being output for display, an indication of additional information to output for display.

In instances where attention detection module 8 determines that the user is likely interacting with, viewing, or otherwise paying attention to computing device 2, attention detection module 8 may send an indication that the user is likely paying attention to computing device 2 to information depth module 10. Responsive to receiving the indication, information depth module 10 may determine a second set of information that is associated with the event and is to be output, by UID 4, for display. In the example of FIG. 1, information depth module 10 determines that the second set of information includes details of the upcoming flight.

Information depth module 10 may provide an indication of the second set of information to UI module 6 to cause UID 4 to output an updated GUI that includes at least a portion of the second set of information. For example, information depth module 10 may provide an indication of the flight details to UI module 6, which, in turn, causes UID 4 to output GUI 14B. As shown in FIG. 1, GUI 14B includes details of the upcoming flight, including departure airport, time, terminal, and gate, as well as flight number and a link to an online flight check-in interface.

If, after GUI 14B is output for display, attention detection module 8 determines that the user is no longer paying attention to computing device 2, UID 4 may output a different GUI, such as a default GUI (e.g., a clock, a calendar, etc.). In instances where attention detection module 8 determines that the user continues to pay attention to computing device 2, information depth module 10 may provide an indication of a third set of information to UI module 6 for output by UID 4. The third set of information may include additional details associated with the event determined to be less important or requiring more user attention to comprehend than the previously output information. As shown in FIG. 1, GUI 14C includes an estimated amount of time required for the user to travel from the user's current location to the airport, a map illustrating the current traffic conditions, and a link to navigation directions.

In some examples, after displaying additional details associated with the event, a user may flip between virtual "cards" of information in a graphical user interface. That is, the information associated with the event may be displayed within a virtual card. Each event may be associated with a distinct virtual card and each virtual card may include child cards for each different level of information granularity associated with the event. The cards may be organized such that the virtual cards for each unique event are organized horizontally and the child cards for each unique event are organized vertically. In this organization structure, a user may provide an input corresponding to a swipe gesture moving horizontally across UID 4 to flip between virtual cards. In instances where attention detection module 8 determines that the user is paying attention to a particular card, information depth module 10 may output the next child card down the vertical stack of virtual cards for the particular event.

In one example, computing device 2 outputs, for display, GUI 14B and receives an indication of user input to flip from the card associated with the flight event to another card. Responsive to receiving the indication of the user input, computing device 2 may output a different virtual card associated with a different event (e.g., an email, a text message, a calendar event, etc.). In various instances, information depth module 10 may determine that the virtual card associated with the additional event should include the same level of granularity of information for the additional event as the previously displayed virtual card (e.g., GUI 14B). That is, rather than outputting the parent virtual card for the additional event, computing device 2, in some instances, may output, for display, the same level child card for the additional event. For example, if the additional event is an incoming email, rather than displaying an infographic indicating the subject and sender of the email, computing device 2 may output the name of the sender and a portion of the subject and/or body of the email.

If computing device 2 receives additional indications of user inputs to flip between the virtual cards, attention detection module 8 may determine a rate at which the user is flipping between the virtual cards and determine if the rate satisfies a threshold flip rate (e.g., flipping between cards at a rate of greater than one per second, two per second, etc.). Responsive to attention detection module 8 determining that the flip rate satisfies the threshold flip rate, information depth module 10 may reduce the granularity of information included in each virtual card such that the amount of information displayed corresponds to the amount of time the user views the particular card (e.g., by causing computing device 2 to output a child card higher in the stack and/or outputting the parent virtual card for the event). That is, information depth module 10 may dynamically adjust the amount and/or granularity of information included in each virtual card based on the amount of attention a user is providing to each virtual card.

In this manner, techniques of this disclosure may enable a computing device to dynamical adjust, based on a determined indication of the amount and/or duration of attention the user is paying to the computing device, the depth of information output, for display, by the computing device in association with a notification. By dynamically adjusting the depth of information being output, techniques of this disclosure may enable a user to quickly view the most important information associated with a subject of a notification (e.g., an event) while providing a mechanism for the user to be able to view additional information for the event by simply continuing to pay attention to the computing device.

Figure 2:
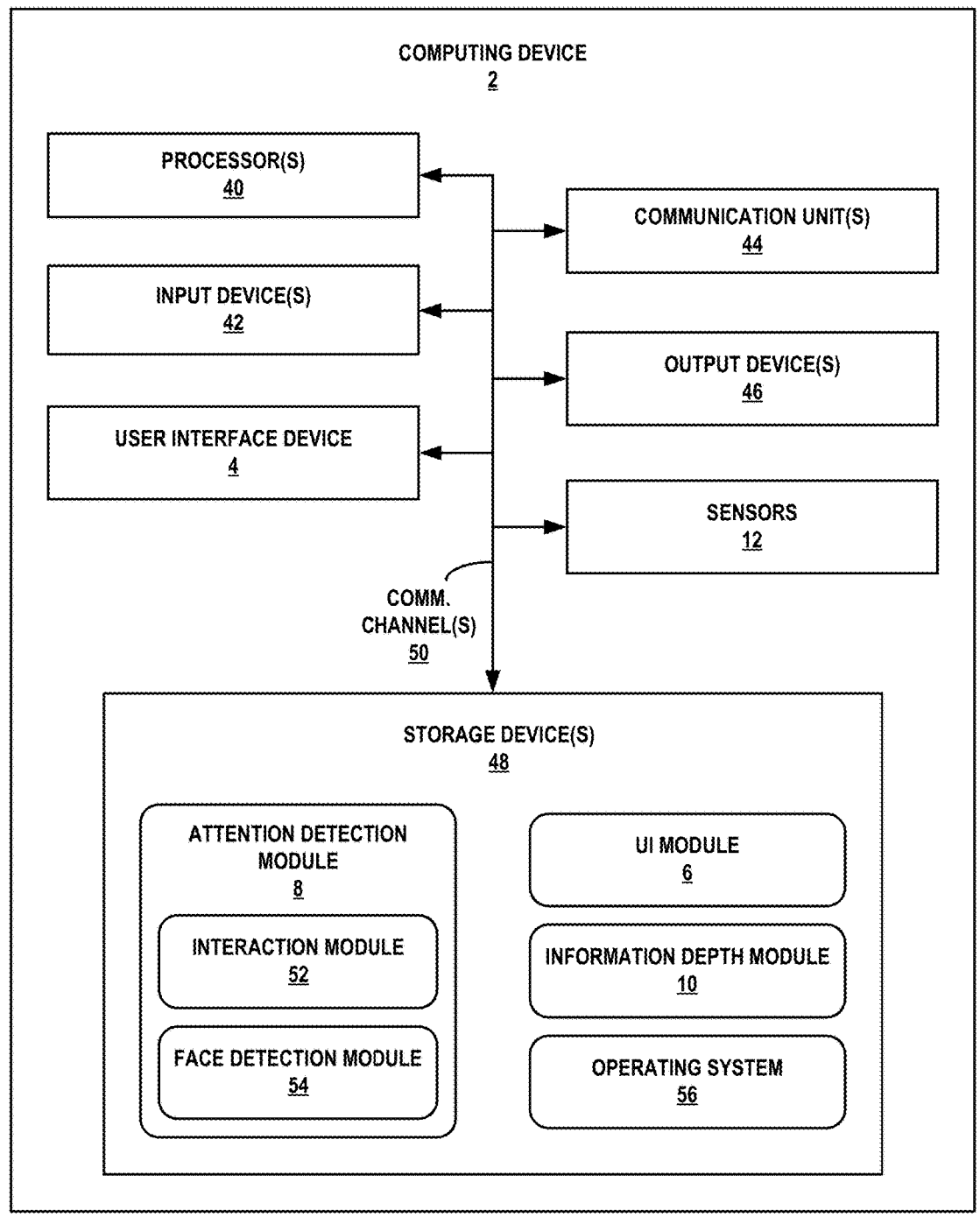
FIG. 2 is a block diagram illustrating an example computing device that adjusts the depth of information displayed, in accordance with one or more techniques of the present disclosure.

FIG. 2 is a block diagram illustrating an example computing device that adjusts the depth of information displayed, in accordance with one or more techniques of the present disclosure. Computing device 2 of FIG. 2 is described below within the context of FIG. 1. FIG. 2 illustrates only one particular example of computing device 2, and many other examples of computing device 2 may be used in other instances and may include a subset of the components included in example computing device 2 or may include additional components not shown in FIG. 2.

As shown in the example of FIG. 2, computing device 2 includes one or more processors 40, one or more input devices 42, user interface device 4 ("UID 4"), one or more communication units 44, one or more output devices 46, one or more sensors 12, and one or more storage devices 48. Storage devices 48 of computing device 2 also include UI module 6, attention detection module 8, information depth module 10, and operating system 56. Computing device 2 can include additional components that, for clarity, are not shown in FIG. 2. For example, computing device 2 can include a battery to provide power to the components of computing device 2. Similarly, the components of computing device 2 shown in FIG. 2 may not be necessary in every example of computing device 2. For example, in some configurations, computing device 2 may not include output devices 46.

Communication channels 50 may interconnect each of the components 4, 12, 40, 42, 44, 46, and 48 for inter-component communications (physically, communicatively, and/or operatively). In some examples, communication channels 50 may include a system bus, a network connection, an inter-process communication data structure, or any other method for communicating data.

One or more processors 40 may implement functionality and/or execute instructions within computing device 2. For example, processors 40 of computing device 2 may receive and execute instructions stored by storage devices 48 that execute the functionality of modules 6, 8, and 10. These instructions executed by processors 40 may cause computing device 2 to read/write/etc. information, such as one or more data files stored within storage devices 48 during program execution. Processors 40 may execute instructions of modules 6, 8, and 10 to cause UID 4 to output one or more graphical indications of incoming communications for display at UID 4 as content of a user interface. That is, modules 6, 8, and 10 may be operable by processors 40 to perform various actions or functions of computing device 2, for instance, causing UID 4 to a present a graphical user interface at UID 4.

One or more communication units 44 of computing device 2 may communicate with external devices via one or more wired and/or wireless networks by transmitting and/or receiving network signals on the one or more networks. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless network radios, as well as universal serial bus (USB) controllers.

One or more output devices 46 of computing device 2 may generate output. Examples of output are tactile, audio, and video output. Output devices 46 of computing device 2, in one example, includes a presence-sensitive display, sound card, video graphics adapter card, speaker, cathode ray tube (CRT) monitor, liquid crystal display (LCD), or any other type of device for generating output to a human or machine.

One or more input devices 42 of computing device 2 receive input. Examples of input are tactile, audio, and video input. Input devices 42 of computing device 2, in one example, includes a presence-sensitive display, touch-sensitive screen, mouse, keyboard, voice responsive system, video camera, microphone, or any other type of device for detecting input from a human or machine.

In some examples, UID 4 of computing device 2 may include functionality of input devices 42 and/or output devices 46. In the example of FIG. 2, UID 4 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. In the example of FIG. 2, UID 4 presents a graphical user interface, such as graphical user interfaces 14 of FIG. 1.

While illustrated as an internal component of computing device 2, UID 4 also represents an external component that shares a data path with computing device 2 for transmitting and/or receiving input and output. For instance, in one example, UID 4 represents a built-in component of computing device 2 located within and physically connected to the external packaging of computing device 2 (e.g., a screen on a mobile phone). In another example, UID 4 represents an external component of computing device 2 located outside and physically separated from the packaging of computing device 2 (e.g., a monitor, a projector, etc. that shares a wired and/or wireless data path with a tablet computer).

Sensors 12 may be configured to measure the movement of computing device 2 and may collect other information associated with computing device 2. For instance, sensors 12 may be configured to measure the position, rotation, velocity, and/or acceleration of computing device 2. Examples of sensors 12 that detect and/or measure movement of computing device 2 may include, but are not limited to, accelerometers and gyroscopes. Sensors 12 may also include a clasp sensor (e.g., in examples where computing device 2 is a wearable computing device having a clasp), a galvanic skin response sensor, and any other type of sensor capable of collecting information related to computing device 2.

One or more storage devices 48 within computing device 2 may store information for processing during operation of computing device 2 (e.g., computing device 2 may store data that modules 6, 8, and 10 may access during execution at computing device 2). In some examples, storage device 48 is a temporary memory, meaning that a primary purpose of storage device 48 is not long-term storage. Storage devices 48 on computing device 10 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or information (e.g., data) associated with modules 6, 8, and 10 and operating system 56.

Operating system 56, in some examples, controls the operation of components of computing device 2. For example, operating system 56, in one example, facilitates the communication of UI module 6, attention detection module 8, and information depth module 10 with processors 40, one or more output devices 46, UID 4, one or more communication units 44, one or more input devices 42, and one or more sensors 12. UI module 6, attention detection module 8, and information depth module 10 may each include program instructions and/or data that are executable by computing device 2 (e.g., by one or more processors 40). As one example, UI module 6 can include instructions that cause computing device 2 to perform one or more of the operations and actions described in the present disclosure.

UI module 6 may cause UID 4 to output a graphical user interface (e.g., graphical user interfaces 14A, 14B, 14C) for display, as a user of computing device 2 views output and/or provides input at UID 4. UI module 6 and UID 4 may receive one or more indications of input from a user as the user interacts with the graphical user interface, at different times and when the user and computing device 2 are at different locations. UI module 6 and UID 4 may interpret inputs detected at UID 4 (e.g., as a user provides one or more gestures at one or more locations of UID 4 at which the graphical user interface is displayed) and may relay information about the inputs detected at UID 4 to one or more associated platforms, operating systems, applications, and/or services executing at computing device 2, to cause computing device 2 to perform functions.

UI module 6 may receive information and instructions from one or more associated platforms, operating systems, applications, and/or services executing at computing device 2 (e.g., attention detection module 8, information depth module 10, etc.) for generating a graphical user interface. In addition, UI module 6 may act as an intermediary between the one or more associated platforms, operating systems, applications, and/or services executing at computing device 2 and various output devices of computing device 2 (e.g., speakers, LED indicators, audio or electrostatic haptic output device, etc.) to produce output (e.g., a graphic, a flash of light, a sound, a haptic response, etc.) with computing device 2.

Computing device 2 may receive an indication of an event, such as an incoming communication, a system notification, a calendar reminder, current activity information, etc. In some examples, computing device 2 may receive the indication of the event from an external device (e.g., a server system, a companion device, etc.) via communication units 44. Prior to outputting, for display, an indication of the event (e.g., a graphical indication output by UID 4, an indication output by one of output devices 46, etc.), information depth module 10 may determine information associated with the event, the relative priority of various portions of the information, and may aggregate, based on the respective relative priority of the each portion of information, the various portions of information into different sets of information. The priority of each portion of information may be determined by information depth module 10 based on the importance of the portion of the information to the event (e.g., a starting time of an event may be more important than a duration of the event) and/or based on the amount of attention required for a user to read or otherwise comprehend the portion of information (e.g., it may take longer for a user to read the body of an email than to read the subject of the email).

As one example, if the event is information generated by an application currently executing at computing device 2 and associated with a current activity in which the user is engaged (e.g., running, walking, etc.), information depth module 10 may determine that information associated with the event (i.e., the current activity) includes a current running pace, a current location of computing device 2, an average pace for the run, a distance traveled since the beginning of the run, a route associated with the run, a distance from the current location of computing device 2 to the origin location of the run, a current elevation, a total amount of elevation gain and loss during the run, etc. Information depth module 10 may determine that the current running pace is the most important information associated with the run and may require only a little attention from the user for the user to receive the information. Accordingly, information depth module may determine that a first set of information associated with the event includes the current running pace. Information depth module 10 may determine that a current location of computing device 2 has the next highest priority and may include the current location in a second set of information associated with the event. In some examples, information depth module 10 may continue in this manner until all of the information associated with the event is prioritized. In other examples, information depth module 10 may initially determine the most importation portions of information that should be initially displayed and determine subsequent portions of information to be displayed in response to receiving an indication that the user is continuing to pay attention to computing device 2.

While described as automatically determining the relative priority of the information associated with the events, in some examples, the user may provide configuration information specifying a priority for the various portions of information associated with a type of the event (e.g., the current running pace is the most important information for running-type events, the location and start time is the most important information for meeting-type events, etc.). In these examples, information depth module 10 may determine the relative priority of the various portions of information associated with the event based on the user-specified priorities.

As another example, computing device 2 may receive an indication of a user ordering a cab. Information depth module 10 may determine that the information associated with the ordering of the cab includes an amount of time until the cab arrives at a current location of computing device 2 or a pickup location specified when ordering the cab, a driver of the cab, a rating of the driver, a map showing the current location of the cab, pricing information for the cab, etc. Information depth module 10 may determine that the amount of time until the cab arrives at the pickup location is the most important portion of information and may be quickly comprehended by the user. Accordingly, information depth module 10 may determine that the amount of time is included in the initial set of information associated with the event that will be output, for display, by computing device 2.

In general, after determining the first set of information associated with the event to be output, for display, by computing device 2, information depth module 10 provides an indication of the first set of information to UI module 6. UI module 6 generates a graphical indication of the first set of information for display by UID 4. In some examples, the graphical indication of the first set of information includes a visual rendering of the first set of information. The visual rendering may convey the essence of the event and may include an infographic, emoji, a picture of a person associated with the event, an image indicating the subject of the event, etc.

Figure 3:
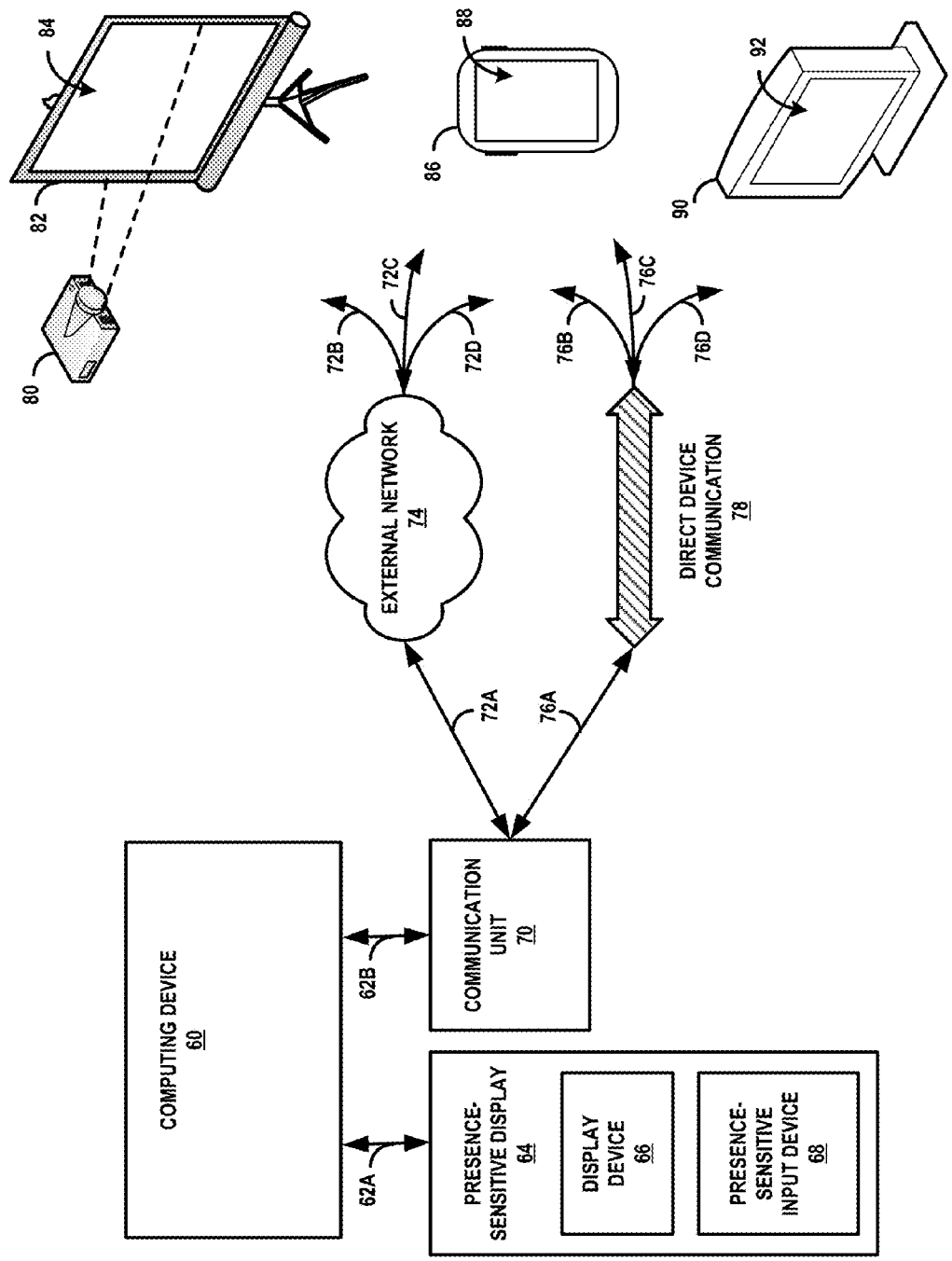
FIG. 3 is a block diagram illustrating an example computing device that outputs information for display at a remote device, in accordance with one or more techniques of the present disclosure.

Attention detection module 8 may determine whether or not a user of computing device 2 is looking at, interacting with, or otherwise paying attention to computing device 2. As shown in FIG. 3, attention detection module 8 includes interaction module 52 and face detection module 54. Interaction module 52 may determine whether the user is interacting with computing device 2. For example, in order to determine if a user is interacting with computing device 2, interaction module 52 may analyze information received from sensors 12, input devices 42, and/or UID 4.

As one example, UID 4 and/or input devices 42 may detect user input. The user input may include a gesture associated with swiping between sets of displayed information (e.g., between visual cards in a card-based graphical user interface system). Responsive to detecting the user input, UID 4 and/or input devices 42 may provide an indication of the user input to interaction module 52. Interaction module 52 may determine, based on the indication of the user input, that the user is actively interacting with computing device 2.

In some examples, computing device 2 may be a wearable computing device, such as a computerized watch. In these examples, the user associated with computing device 2 may attempt to view computing device 2. In some examples, the user may attempt to view computing device 2 by moving the arm on which wearable computing device 2 is being worn. For instance, the user may engage in a motion similar to the motion a person performs to look at a watch. The motion may include an internal rotation of the user's wrist and a flexion of the user's shoulder and elbow. One or more sensors 12 of wearable computing device 2 may detect the user's movements and may provide motion data corresponding to the detected movement to interaction module 52.

Interaction module 52 may receive the motion data and may determine, based on the motion data, that the user is likely viewing a display of computing device 2 (e.g., UID 4, one of output devices 46, etc.). For instance, interaction module 52 may analyze the motion data and determine that the user internally rotated his/her wrist (e.g., the motion data indicates that computing device 2 has rotated). Additionally, interaction module 52 may analyze the motion data and determine that the user has flexed his/her shoulder and/or his/her elbow (e.g., the motion data indicates that computing device 2 has moved vertically and/or laterally). As illustrated in FIG. 1, the user has internally rotated his/her wrist and flexed his/her elbow.

In some instances, interaction module 52 may determine an amount of time that has elapsed between when UID 4 outputs, for display, the graphical indication of the first set of data and when sensors 12 detect the motion. In these instances, if the amount of time that has elapsed is less than a threshold amount of time, interaction module 52 may determine that the user is viewing a display of computing device 2 and is viewing the graphical indication of the first set of data. If sensors 12 do not detection additional motion data that indicates the user has stopped looking at a display of computing device 2 (e.g., indicative of the user putting his/her arm down by his/her side), attention detection module 8 may determine that the user is continuing to give his/her attention to computing device 2. If sensors provide motion data to interaction module 52 indicative of the user putting his/her arm down by his/her side or otherwise indication of no longer viewing a display of computing device 2, attention detection module 8 may determine that the user is no longer paying attention to computing device 2.

In some examples, interaction module 52 may determine that the user is paying attention to computing device 2 using a combination of detected user input and motion data. For example, if the user is providing input to flip between virtual "cards" of a graphical user interface and then pauses (e.g., computing device 2 does not detect user input for a period of time), interaction module 52 may determine whether the user is still viewing a display of computing device 2 based on motion data from sensors 12. For example, if computing device 2 ceases detecting user input, interaction module 52 may analyze motion data received from sensors 12 after the last detected user input. If the motion data corresponds to a movement of the user's arm down and away, interaction module 52 may determine that the user is no longer paying attention to computing device 2. If the motion data indicates that the user is generally holding computing device 2 in the same position as computing device 2 was when the last user input was detected, interaction module 52 may determine that the user is continuing to pay attention to computing device 2.

In some examples attention detection module 8 may determine how frequently a user is flipping through information output by UID 4. If the user pauses such that a greater amount of time elapses between detected user inputs, attention detection module 8 may determine that the user would like additional information associated with the particular event having information currently displayed. For example, if a user is flipping through email notifications and pauses on a particular email inviting the user to a party, interaction module 52 may detect the pause and send a message to information depth module 10 to cause information depth module 10 to provide UI module 6 an additional set of information associated with the particular email. That is, based on how fast the user is flipping through the information displayed in the card-based user interface, attention detection module 8 may dynamically adjust the duration of a pause threshold for triggering a request for additional information from information depth module 10.

In some examples, attention detection module 8 may determine that a user of computing device 2 is engaged in an activity
(e.g., running, walking, driving, bicycling, playing tennis, etc.) that may make it more difficult for the user to read and understand the information being output, for display, by computing device 2 and may alter the amount of time the information is output by computing device 2. For example, if motion data from sensors 12 indicates that the user of computing device 2 is running, attention detection module 8 may cause UI module 6 to output each set of information for a longer period of time before outputting a subsequent set of information.

As another example, if attention detection module 8 determines that the user of computing device 2 is driving a car, attention detection module 8 may cause UI module 6 to refrain from outputting information associated with the event so as to reduce distractions for the user while he/she is driving. In various instances, computing device 2 may determine a rate of speed of computing device 2 (e.g., traveling at 60 mph along a freeway, traveling at 3 mph in traffic) and information depth module 10 may adjust, based on the rate of speed, the amount of information included in each set of information. For instance, if the user is in stop and go traffic, information depth module 10 may determine that the user can pay more attention to computing device 2 and may include more information in each set of information as compared to if computing device 2 is traveling at 60 mph along a freeway.

In another example, face detection module 54 may receive image data captured by one of input devices 42 (e.g., video data, still image data, etc. captured by a camera) and determine if the image data includes one or more users. In some examples, face detection module 54 may determine if the image data includes a face of the user associated with computing device 2. In some example, face detection module 54 may compare a face detected in the image data to one or more template images that include a face of the user associated with computing device 2. If the face detected in the image data matches one of the faces in the template images, face detection module 54 may determine that the user associated with computing device 2 is view a display of computing device 2.

In various examples, face detection module 54 may also include eye-tracking functionality. In these examples, face detection module 54 may analyze data for a series of images and/or video data and determine, based on the image and/or video data, that a user of computing device 2 is currently looking at a display of computing device 2. In some instances, face detection module 54 may track the eye movement of the user in the image and/or video data and determine that the user is reading information displayed by computing device 2.

No matter how attention detection module 8 determines that a user of computing device 2 is paying attention to computing device 2, attention detection module 8 may provide an indication that the user is paying attention to computing device 2 to information depth module 10. In some examples, attention detection module 8 provides such a notification if attention detection module 8 determines that the user continues to pay attention to computing device 2 for at least a threshold amount of time. In some example, attention detection module 8 may also provide such an indication to information depth module 10 in response to interaction module 52 determining that a detected user input corresponds to a request for additional information.

Responsive to receiving an indication that the user is continuing to pay attention to computing device 2 and/or that the user would like additional information, information depth module 10 may identify an additional set of information to be output by UID 4 and for display. The additional set of information may include additional and/or different information as compared to any previous set of information that was output by UID 4. In some examples, the additional set of information includes a portion of information that was previously output by UID 4.

FIG. 3 is a block diagram illustrating an example computing device that outputs information for display at a remote device, in accordance with one or more techniques of the present disclosure. Graphical content, generally, may include any visual information that may be output for display, such as text, images, a group of moving images, etc. The example shown in FIG. 3 includes a computing device 60, presence-sensitive display 64, communication unit 70, projector 80, projector screen 82, mobile device 86, and visual display device 90. Although shown for purposes of example in FIGS. 1 and 2 as a stand-alone computing device, a computing device, such as computing device 60, may generally be any component or system that includes a processor or other suitable computing environment for executing software instructions and, for example, need not include a presence-sensitive display.

As shown in the example of FIG. 3, computing device 60 may be a processor that includes functionality as described with respect to processor 40 in FIG. 2. In such examples, computing device 60 may be operatively coupled to presence-sensitive display 64 by a communication channel 62A, which may be a system bus or other suitable connection. Computing device 60 may also be operatively coupled to communication unit 70, further described below, by a communication channel 62B, which may also be a system bus or other suitable connection. Although shown separately as an example in FIG. 3, computing device 60 may be operatively coupled to presence-sensitive display 64 and communication unit 70 by any number of one or more communication channels.

In other examples, such as illustrated previously by computing device 2 in FIGS. 1 and 3, a computing device may refer to a portable or mobile device such as mobile phones (including smart phones), wearable devices (including smart watches) laptop computers, etc. In some examples, a computing device may be a desktop computers, tablet computers, smart television platforms, cameras, personal digital assistants (PDAs), servers, mainframes, etc.

Presence-sensitive display 64, like UID 4 as shown in FIG. 1, may include display device 66 and presence-sensitive input device 68. Display device 66 may, for example, receive data from computing device 60 and display the graphical content. In some examples, presence-sensitive input device 68 may determine one or more user inputs (e.g., continuous gestures, multi-touch gestures, single-touch gestures, etc.) at presence-sensitive display 64 using capacitive, inductive, and/or optical recognition techniques and send indications of such user input to computing device 60 using communication channel 62A. In some examples, presence-sensitive input device 68 may be physically positioned on top of display device 66 such that, when a user positions an input unit over a graphical element displayed by display device 66, the location at which presence-sensitive input device 68 corresponds to the location of display device 66 at which the graphical element is displayed. In other examples, presence-sensitive input device 68 may be positioned physically apart from display device 66, and locations of presence-sensitive input device 68 may correspond to locations of display device 66, such that input can be made at presence-sensitive input device 68 for interacting with graphical elements displayed at corresponding locations of display device 66.

As shown in FIG. 3, computing device 60 may also include and/or be operatively coupled with communication unit 70. Communication unit 70 may include functionality of communication unit 44 as described in FIG. 2. Examples of communication unit 70 may include a network interface card, an Ethernet card, an optical transceiver, a radio frequency transceiver, or any other type of device that can send and receive information. Other examples of such communication units may include Bluetooth, 3G and Wi-Fi radios, Universal Serial Bus (USB) interfaces, etc. Computing device 130 may also include and/or be operatively coupled with one or more other devices, e.g., input devices, output devices, memory, storage devices, etc. that are not shown in FIG. 3 for purposes of brevity and illustration.

FIG. 3 also illustrates a projector 80 and projector screen 82. Other such examples of projection devices may include electronic whiteboards, holographic display devices, and any other suitable devices for displaying graphical content. Projector 80 and projector screen 82 may include one or more communication units that enable the respective devices to communicate with computing device 60. In some examples, the one or more communication units may enable communication between projector 80 and projector screen 82. Projector 80 may receive data from computing device 60 that includes graphical content. Projector 80, in response to receiving the data, may project the graphical content onto projector screen 82. In some examples, projector 80 may determine one or more user inputs (e.g., continuous gestures, multi-touch gestures, single-touch gestures, etc.) at projector screen using optical recognition or other suitable techniques and send indications of such user input using one or more communication units to computing device 60. In such examples, projector screen 82 may be unnecessary, and projector 80 may project graphical content on any suitable medium and detect one or more user inputs using optical recognition or other such suitable techniques.

Projector screen 82, in some examples, may include a presence-sensitive display 84. Presence-sensitive display 84 may include a subset of functionality or all of the functionality of UID 4 as described in this disclosure. In some examples, presence-sensitive display 84 may include additional functionality. Projector screen 82 (e.g., an electronic whiteboard), may receive data from computing device 60 and display the graphical content. In some examples, presence-sensitive display 84 may determine one or more user inputs (e.g., continuous gestures, multi-touch gestures, single-touch gestures, etc.) at projector screen 82 using capacitive, inductive, and/or optical recognition techniques and send indications of such user input using one or more communication units to computing device 60.

FIG. 3 also illustrates mobile device 86 and visual display device 90. Mobile device 86 and visual display device 90 may each include computing and connectivity capabilities. Examples of mobile device 86 may include e-reader devices, convertible notebook devices, hybrid slate devices, wearable devices, etc. Examples of visual display device 90 may include other semi-stationary devices such as televisions, computer monitors, etc. As shown in FIG. 3, mobile device 86 may include a presence-sensitive display 88. Visual display device 90 may include a presence-sensitive display 92. Presence-sensitive displays 88, 92 may include a subset of functionality or all of the functionality of UID 4 as described in this disclosure. In some examples, presence-sensitive displays 88, 92 may include additional functionality. In any case, presence-sensitive display 92, for example, may receive data from computing device 60 and display the graphical content. In some examples, presence-sensitive display 92 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 60.

As described above, in some examples, computing device 60 may output graphical content for display at presence-sensitive display 64 that is coupled to computing device 60 by a system bus or other suitable communication channel. Computing device 60 may also output graphical content for display at one or more remote devices, such as projector 150, projector screen 82, mobile device 86, and visual display device 90. For instance, computing device 60 may execute one or more instructions to generate and/or modify graphical content in accordance with techniques of the present disclosure. Computing device 60 may output the data that includes the graphical content to a communication unit of computing device 60, such as communication unit 70. Communication unit 70 may send the data to one or more of the remote devices, such as projector 80, projector screen 82, mobile device 86, and/or visual display device 90. In this way, computing device 60 may output the graphical content for display at one or more of the remote devices. In some examples, one or more of the remote devices may output the graphical content at a presence-sensitive display that is included in and/or operatively coupled to the respective remote devices.

In some examples, computing device 60 may not output graphical content at presence-sensitive display 64 that is operatively coupled to computing device 60. In other examples, computing device 60 may output graphical content for display at both a presence-sensitive display 64 that is coupled to computing device 60 by communication channel 62A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 60 and output for display at presence-sensitive display 64 may be different than graphical content display output for display at one or more remote devices.

Computing device 60 may send and receive data using any suitable communication techniques. For example, computing device 60 may be operatively coupled to external network 74 using network link 72A. Each of the remote devices illustrated in FIG. 3 may be operatively coupled to network external network 74 by one of respective network links 72B, 72C, and 72D. External network 74 may include network hubs, network switches, network routers, etc., that are operatively inter-coupled thereby providing for the exchange of information between computing device 60 and the remote devices illustrated in FIG. 3. In some examples, network links 72A-72D may be Ethernet, ATM or other network connections. Such connections may be wireless and/or wired connections.

In some examples, computing device 60 may be operatively coupled to one or more of the remote devices included in FIG. 3 using direct device communication 78. Direct device communication 78 may include communications through which computing device 60 sends and receives data directly with a remote device, using wired or wireless communication. That is, in some examples of direct device communication 78, data sent by computing device 60 may not be forwarded by one or more additional devices before being received at the remote device, and vice-versa. Examples of direct device communication 78 may include Bluetooth, Near-Field Communication, Universal Serial Bus, Wi-Fi, infrared, etc. One or more of the remote devices illustrated in FIG. 3 may be operatively coupled with computing device 60 by communication links 76A-76D. In some examples, communication links 76A-76D may be connections using Bluetooth, Near-Field Communication, Universal Serial Bus, infrared, etc. Such connections may be wireless and/or wired connections.

In accordance with techniques of the disclosure, computing device 60 may be operatively coupled to visual display device 90 using external network 74. Computing device 60 may determine that the user is currently viewing visual display device 90 and, in response, output a graphical indication of an event for display at presence-sensitive display 92. For instance, computing device 60 may send data that includes a representation of the graphical indication to communication unit 70. Communication unit 70 may send the data that includes the representation of the graphical indication to visual display device 90 using external network 74. Visual display device 90, in response to receiving the data using external network 74, may cause presence-sensitive display 92 to output the graphical indication.

If computing device 60 determines that the user is continuing to view and/or interact with visual display device 90 (e.g., based on user input detected by presence-sensitive display 92), computing device 60 may dynamically adjust the depth of the information output by presence-sensitive display 92. For example, if the user continuously interacts with, views, or otherwise pays attention to presence-sensitive display 92, computing device 60 may periodically increase the specificity and and/or amount of information displayed by presence-sensitive display 92 such that the information displayed by presence-sensitive display 92 automatically updates with the additional information as the continues to pay attention to presence-sensitive display 92. That is, the information displayed by presence-sensitive display 92 may automatically update to include additional information without requiring the user to provide input requesting additional information.

Figure 4A:
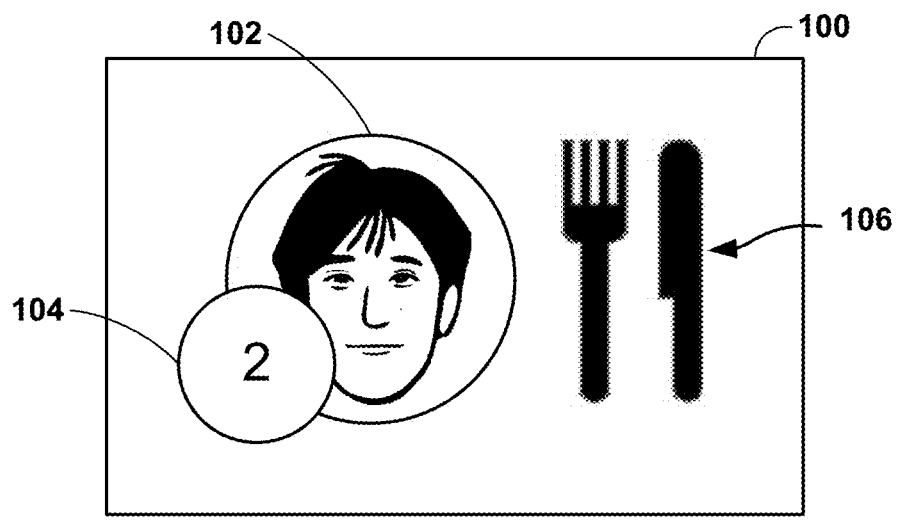
FIGS. 4A-4D are conceptual diagrams illustrating example graphical user interfaces that include different depths of information, in accordance with one or more techniques of the present disclosure.

FIGS. 4A-4D are conceptual diagrams illustrating example graphical user interfaces that include different depths of information, in accordance with one or more techniques of the present disclosure. FIGS. 4A-4D are described below within the context of computing device 2 of FIGS. 1 and 2. For example, FIG. 4A illustrates an example GUI 100 that includes a visual rendering of information associated with emails received from a person. GUI 100 may be output, for display, by UID 4 of computing device 2 in response to computing device 2 receiving an email from person.

In the example illustrated in FIGS. 4A-4D, computing device 2 receives an email about dinner plans. As shown in FIG. 4A, GUI 100 includes a picture 102 of the person who sent the emails, a message count 104 that indicates the number of new emails received form the person, and subject graphic 106 that indicates the subject of a first (e.g., most recent, most important, etc.) email received from the person. In some examples, GUI 100 includes the initial set of information determined by information depth module 10. Information depth module 10 may analyze the incoming email and determine that the incoming email is about dinner plans and is from the same person as another unread email. Accordingly, information depth module 10 determines that an initial set of information about the event (i.e., the incoming email) should include a visual rendering of the subject of the email (i.e., dinner plans), an image of the sender of the email, and an indication of the number of unread emails from this same person. As the received email is about dinner plans, subject graphic 106 is a graphic of a fork and a knife and as there are two unread emails from the person who sent the incoming email, message count 104 includes the number two.

Figure 4B:
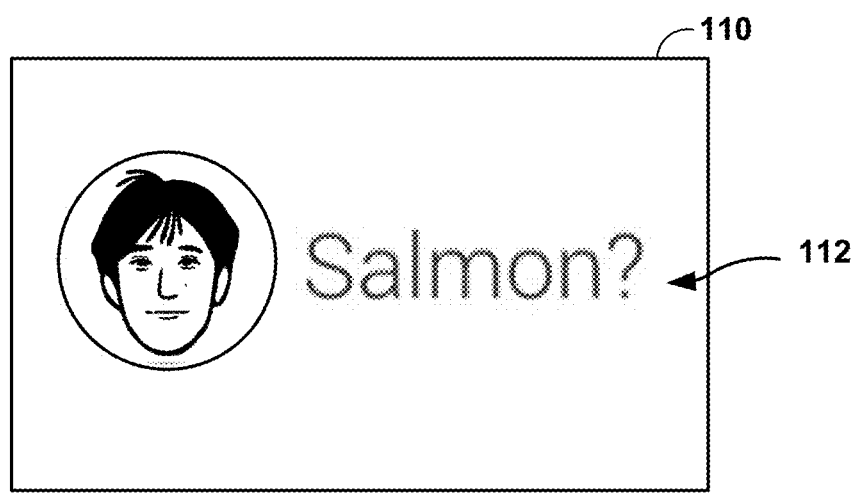

Responsive to attention detection module 8 determining that a user of computing device 2 is paying attention to computing device 2, information depth module 10 determines a second set of information associated with the incoming email. Information depth module 10 may determine that the primary intent of the email is to determine if the user of computing device 2 would like to have salmon for dinner. As such, information depth module 10 determines that the second set of information should include the subject "Salmon?" and an image of the sender of the email. As shown in FIG. 4B, GUI 110 includes subject 112, which corresponds to the primary intent of the email as determined by information depth module 10.

Figure 4C:
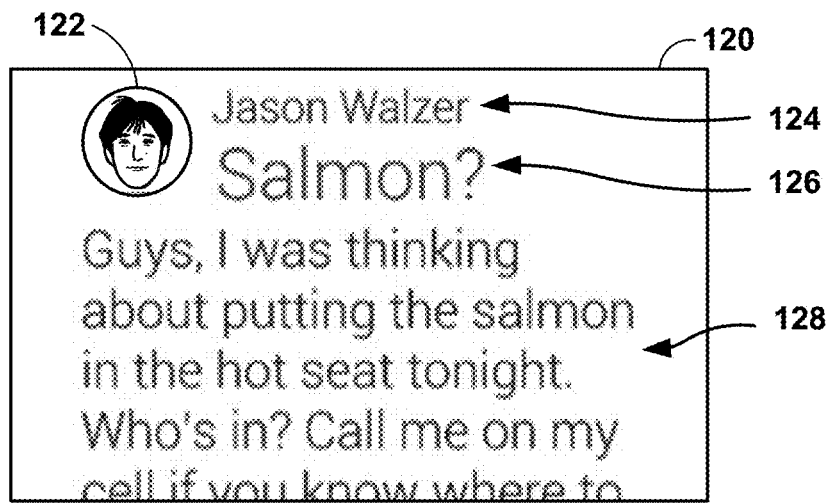
Figure 4D:
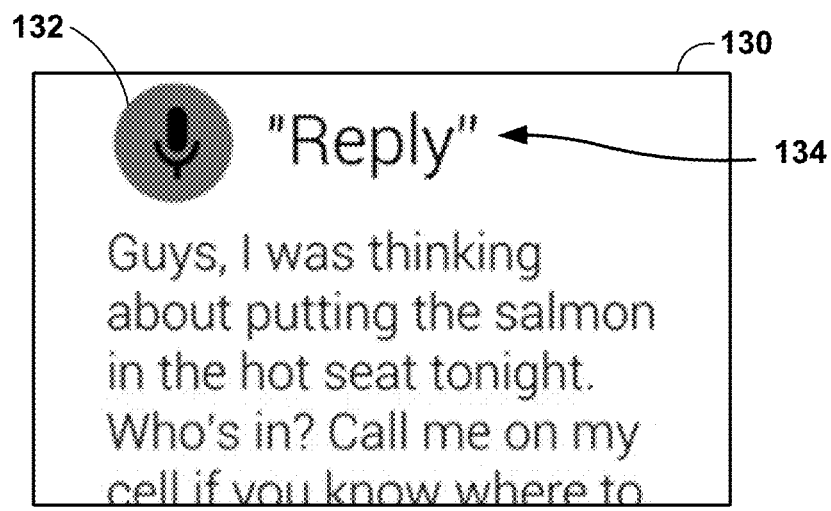

If attention detection module 8 determines that the user of computing device 2 continues to pay attention to computing device 2, information depth module 10 may determine a third set of information associated with the email. As shown in FIG. 4C, the third set of information is included within GUI 120, which includes an image of the sender of the email (e.g., image 122), the name of the sender of the email (e.g., name 124), the determined subject of the email (e.g., subject 126), as well as at least a portion of the text of the email (e.g., content 128).

If attention detection module 8 determines that the user of computing device 2 continues to pay attention to computing device 2, content 128 may automatically scroll as the user continues to view GUI 120, which may enable the user to view the entire text of the email. In addition, information depth module 10 may determine that an additional set of information associated with the event (e.g., the email) includes an action the user can take with respect to the event. GUI 130 of FIG. 4D includes a microphone icon 132 and an indication of action 134. Action 134 indicates that the user of computing device 2 may reply to the email and microphone icon 132 may indicate that computing device 2 is operating in a voice input mode such that the user may speak a command or a response to the email.

In some examples, if attention detection module 8 determines that the user of computing device 2 is still paying attention to computing device 2, information depth module 10 may determine that the next set of information to be displayed by computing device 2 includes information about the second unread email from the same sender. The information about the second unread email may be automatically displayed by computing device 2 and the text may scroll, as described with respect to GUI 120. In some examples, rather than automatically scrolling the texts of an incoming communication or other information associated with an event, a user may provide input to manually scroll the displayed information. In these examples, a user may provide input to select an action to take with respect to the event associated with the displayed information (e.g., snooze an alarm, reply to an email, etc.).

Figure 5:
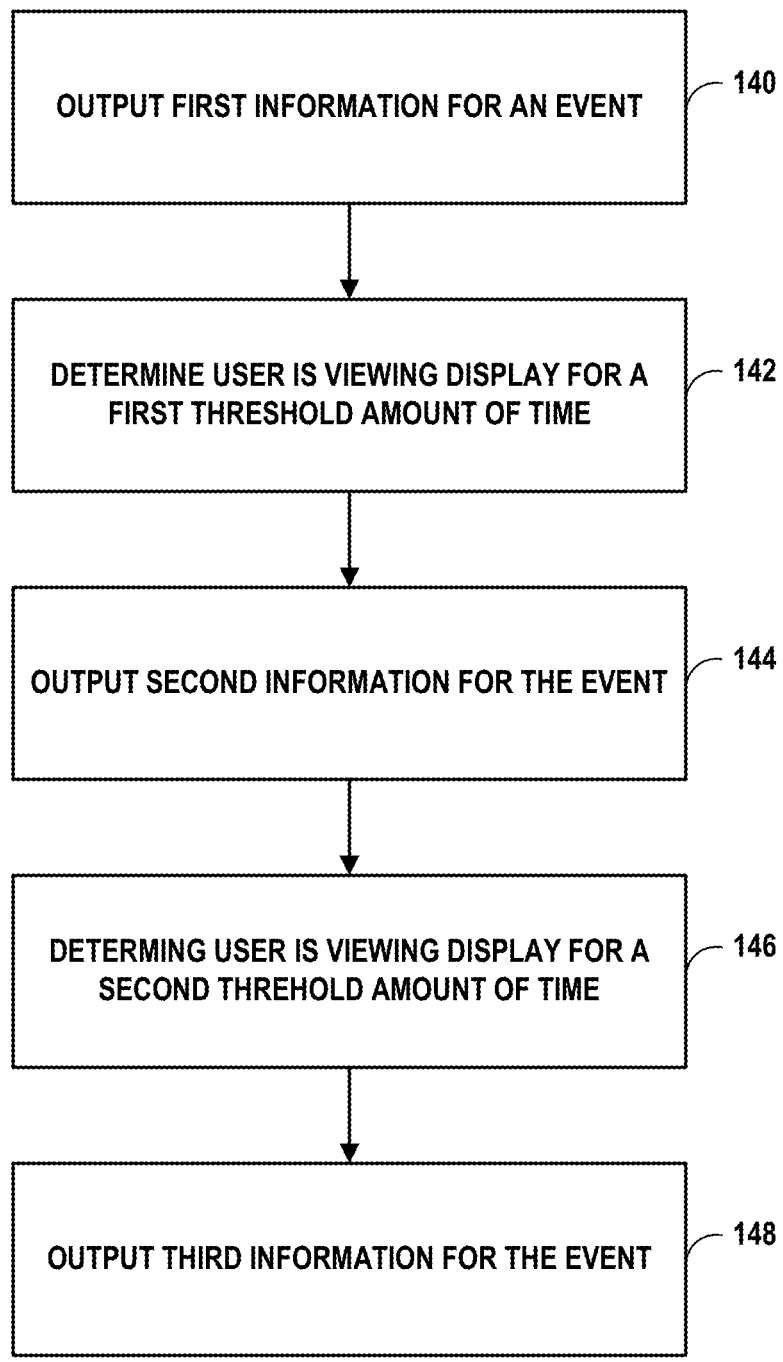
FIG. 5 is a flow diagram illustrating example operations of a computing device to adjust the depth of information displayed, in accordance with one or more techniques of the present disclosure.

FIG. 5 is a flow diagram illustrating example operations of a computing device to adjust the depth of information displayed, in accordance with one or more techniques of the present disclosure. The techniques of FIG. 5 may be performed by one or more processors of a computing device, such as computing devices 2 and 60 illustrated in FIGS. 1-3. For purposes of illustration, the techniques of FIG. 5 are described within the context of computing device 2 of FIGS. 1 and 2, although computing devices having different configurations may perform the techniques of FIG. 5.

In accordance with one or more techniques of the disclosure, computing device 2 may output first information for an event (140). The first information may be associated with an indication of an event received by computing device 2 and may include an initial set of information associated with the event, as determined by information depth module 10. Attention detection module 8 determines whether the user is viewing a display of computing device 2 (e.g., UID 4) or otherwise paying attention to computing device 2 for at least a threshold amount of time (142). The threshold amount of time may be a statically configured amount of time (e.g., 1.5 seconds) or may be dynamically determined based on the frequency of detected user input (e.g., one input every 0.5 seconds, which may correspond to a threshold of one second).

Responsive to attention detection module 8 determining that the user associated with computing device 2 is viewing the display for at least the first threshold amount of time (142), UID 4 may output second information for the event (144). The second information for the event may be a second set of information associated with the event as determined by information depth module 10. The second information may include additional or different information from the first information.

Responsive to attention detection module 8 determining that the user associated with computing device 2 is viewing the display for at least a second threshold amount of time (146), UID 4 may output third information for the event (148). Similar to the second information, the third information for the event may be a third set of information associated with the event as determined by information depth module 10. The third information may include additional or different information from the first or second information.

EXAMPLE 1

A method comprising: outputting, by a computing device and for display, first information for an event; responsive to determining that a user of the computing device has viewed a display device of the computing device for a first threshold amount of time, outputting, by the computing device and for display, second information for the event, the second information including information associated with the event and not included in the first information; and responsive to determining that the user of the computing device has viewed the display device for a second threshold amount of time that is greater than the first threshold amount of time, outputting, by the computing device and for display, third information for the event, the third information including additional information associated with the event and not included in either the first information or the second information.

EXAMPLE 2

The method of example 1, wherein: the event is an incoming communication, the first information includes at least one of an image of a sender of the incoming communication or a graphical representation of a subject of the incoming communication, the second information includes at least one of an indication of a name of the sender or an indication of a type of the incoming communication, and the third information includes at least a portion of text of the incoming communication.

EXAMPLE 3

The method of example 2, wherein the at least the portion of the text of the incoming communication is generated using speech-to-text processing of an audio message.

EXAMPLE 4

The method of any of examples 1-3, wherein the first information, the second information, and the third information are each output by a fitness tracking application executed in response to determining, by the computing device, that the user of the computing device is engaged in a physical activity.

EXAMPLE 5

The method of example 4, wherein the physical activity is at least one of walking, running, or bicycling, and wherein the first information includes at least one of a current pace of the user, the second information includes at least one of elapsed time, average pace, or distance traveled, and the third information includes at least a map of a route taken by the user.

EXAMPLE 6

The method of any of examples 1-5, wherein: the event is a travel event, the first information includes at least one of a graphical representation of a mode of transportation or an indication of an amount of time between the current time and a time at which user should depart a current location, the second information includes departure location information related to the travel event, and the third information includes at least one of an indication of an amount of time between the current time and a time at which the travel event is scheduled to commence, and a map with navigation information.

EXAMPLE 7

The method of any of examples 1-6, further comprising: outputting, by the computing device and for display, information associated with a first event; receiving, by the computing device, an indication of a first user input detected by a presence-sensitive input device; outputting, by the computing device and for display, information associated with a second event; receiving, by the computing device, an indication of a second user input detected by the presence-sensitive input device; outputting, by the computing device and for display, information associated with a third event, therein the third event is the event associated with the notification; and, responsive to determining that a third threshold amount of time has elapsed since receiving the indication of the second user input, outputting the second graphical indication of the notification including the second information for the event.

EXAMPLE 8

The method of any of examples 1-7, wherein determining that the user is viewing the display of the computing device comprises: receiving, by the computing device, motion data generated based on user movements detected by the computing device; and determining, by the computing device and based on the motion data, that the user is viewing the display device of the computing device.

EXAMPLE 9

The method of any of examples 1-8, wherein determining that the user is viewing the display of the computing device comprises: capturing, with a camera of the computing device, at least one image including a face of the user; and determining, based on a position of at least one eye of the user in the at least one image, that the user is viewing the display device of the computing device.

EXAMPLE 10

The method of any of examples 1-9, wherein the first threshold amount of time and the second threshold amount of time change based on a determined activity of the user.

EXAMPLE 11

The method of any of examples 1-10, wherein the event is one or more of a calendar event, an incoming communication, a system notification, a current activity of the user.

EXAMPLE 12

The method of any of examples 1-11, further comprising: determining, by the computing device, important information for the event; and generating, based on the important information, the first information for the event.

EXAMPLE 13

The method of any of examples 1-12, wherein the event is a first event from a plurality of events, wherein each event from the plurality of events is associated with a respective virtual card from a plurality of virtual cards, wherein the third information for the event is included within a first virtual card form the plurality of virtual cards, and wherein the first information is associate with first level of granularity of information for events, the second information is associated with a second level of granularity of information for events, and the third information is associated with a third level of granularity of information for events, the method further comprising: receiving, by the computing device, an indication of first user input to flip to a second virtual card from the plurality of virtual cards, the second virtual card being associated with a second event; outputting, by the computing device and for display, the second virtual card including information for the second event at the third level of granularity; receiving, by the computing device, an indication of second user input to flip to a third virtual card from the plurality of virtual cards, the third virtual card being associated with a third event; and, responsive determining, by the computing device and based on the first user input and the second user input, that a flip rate exceeds a threshold flip rate, outputting, by the computing device and for display, the third virtual card including information for the third event at one of the first level of granularity or the second level of granularity.

EXAMPLE 14

A computing device comprising: one or more processors; and at least one module executable by the one or more processors to: output, for display, first information for an event; responsive to determining that a user of the computing device has viewed a display device of the computing device for a first threshold amount of time, output, for display, second information for the event, the second information including information associated with the event and not included in the first information; and, responsive to determining that the user of the computing device has viewed the display device for a second threshold amount of time that is greater than the first threshold amount of time, output, for display, third information for the event, the third information including additional information associated with the event and not included in either the first information or the second information.

EXAMPLE 15

The computing device of example 14, wherein: the event is a travel event, the first information includes at least one of a graphical representation of a mode of transportation or an indication of an amount of time between the current time and a time at which user should depart a current location, the second information includes departure location information related to the travel event, and the third information includes at least one of an indication of an amount of time between the current time and a time at which the travel event is scheduled to commence, and a map with navigation information.

EXAMPLE 16

The computing device of any of examples 14-15, wherein the at least one module is further operable by the one or more processors to: output, for display, information associated with a first event; receive an indication of a first user input detected by a presence-sensitive input device; output, for display, information associated with a second event; receive an indication of a second user input detected by the presence-sensitive input device; output, for display, information associated with a third event, therein the third event is the event associated with the notification; and, responsive to determining that a third threshold amount of time has elapsed since receiving the indication of the second user input, output the second graphical indication of the notification including the second information for the event.

EXAMPLE 17

The computing device of any of examples 14-16, wherein the at least one module is further operable by the one or more processors to: receive motion data generated based on user movements detected by the computing device; and determine, based on the motion data, that the user is viewing the display device of the computing device.

EXAMPLE 18

The computing device of any of examples 14-17, further comprising: a camera that capture at least one image including a face of the user, wherein the at least one module is further operable by the one or more processors to determine, based on a position of at least one eye of the user in the at least one image, that the user is viewing the display device of the computing device.

EXAMPLE 19

The computing device of any of examples 14-18, wherein the first threshold amount of time and the second threshold amount of time change based on a determined activity of the user.

EXAMPLE 20

The computing device of any of examples 14-19, wherein the at least one module is further operable by the one or more processors to: determine important information for the event; generate, based on the important information, the first information for the event.

EXAMPLE 21

The computing device of any of examples 14-20, wherein the event is a first event from a plurality of events, wherein each event from the plurality of events is associated with a respective virtual card from a plurality of virtual cards, wherein the third information for the event is included within a first virtual card form the plurality of virtual cards, wherein the first information is associate with first level of granularity of information for events, the second information is associated with a second level of granularity of information for events, and the third information is associated with a third level of granularity of information for events, and wherein the at least one module is further operable by the one or more processors to: receive an indication of first user input to flip to a second virtual card from the plurality of virtual cards, the second virtual card being associated with a second event; output, for display, the second virtual card including information for the second event at the third level of granularity; receiving an indication of second user input to flip to a third virtual card from the plurality of virtual cards, the third virtual card being associated with a third event; and, responsive determining, based on the first user input and the second user input, that a flip rate exceeds a threshold flip rate, output, for display, the third virtual card including information for the third event at one of the first level of granularity or the second level of granularity.

EXAMPLE 22

A computing device comprising means for performing the method recited by any of examples 1-13.

EXAMPLE 23

A computer-readable storage medium comprising instructions that, when executed, configure one or more processors of a computing device to: output, for display, first information for an event; responsive to determining that a user of the computing device has viewed a display device of the computing device for a first threshold amount of time, output, for display, second information for the event, the second information including information associated with the event and not included in the first information; and, responsive to determining that the user of the computing device has viewed the display device for a second threshold amount of time that is greater than the first threshold amount of time, output, for display, third information for the event, the third information including additional information associated with the event and not included in either the first information or the second information.

EXAMPLE 24

A computer-readable storage medium comprising instructions that, when executed, cause one or more processors of a computing device to perform the method recited by any of examples 1-13.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the invention have been described. These and other examples are within the scope of the following claims.

What is claimed is:

1. A method comprising:
    displaying, by a display device of a computerized watch, first information for an event;
    adjusting, by the computerized watch and based on a current activity in which a user of the computerized watch is engaged, one or more of a first threshold amount of time or a second threshold amount of time;
    determining, based on motion data generated by the computerized watch, that the user of the computerized watch is viewing the display device; and
        while the user of the computerized watch is determined to be viewing the display device: responsive to determining that the user of the computerized watch has viewed a
        display device for at least the first threshold amount of time, displaying, by the display device, second information for the event, the second information including information associated with the event, wherein at least a portion of the second information is not included in the first information; and
        responsive to determining that the user of the computerized watch has viewed the display device for at least the second threshold amount of time that is greater than the first threshold amount of time, displaying, by the display device, third information for the event, wherein at least a portion of the third information is not included in either the first information or the second information.

2. The method of claim 1, wherein:
    the event is an incoming communication,
    the first information includes at least one of an image of a sender of the incoming communication or a graphical representation of a subject of the incoming communication,
    the second information includes at least one of an indication of a name of the sender or an indication of a type of the incoming communication, and
    the third information includes at least a portion of text of the incoming communication.

3. The method of claim 2, wherein the at least the portion of the text of the incoming communication is generated using speech-to-text processing of an audio message.

4. The method of claim 1, wherein the first information, the second information, and the third information are each output by a fitness-tracking application executed in response to determining that the current activity in which the user of the computerized watch is engaged is a physical activity.

5. The method of claim 4, wherein the physical activity is at least one of walking, running, or bicycling, and wherein the first information includes at least one of a current pace of the user, the second information includes at least one of elapsed time, average pace, or distance traveled, and the third information includes at least a map of a route taken by the user.

6. The method of claim 1, wherein:
the event is a travel event, the first information includes at least one of a graphical representation of a mode of transportation or an indication of an amount of time between a current time and a time at which the user should depart a current location of the computerized watch,
the second information includes departure location information related to the travel event,
and
the third information includes at least one of an indication of an amount of time between the current time and a time at which the travel event is scheduled to commence, and a map with navigation information.

7. The method of claim 1, wherein the event is a third event, the method further comprising:
prior to outputting the first information associated with the third event:
displaying, by the display device, information associated with a first event;
receiving, by the computerized watch, an indication of a first user input detected by a presence-sensitive input device;
displaying, by the display device, information associated with a second event; and
receiving, by the computerized watch, an indication of a second user input detected by the presence-sensitive input device,
wherein displaying the first information for the third event is in response to receiving the indication of the second user input, and
wherein displaying the second information for the third event is in response to determining that at least a third threshold amount of time has elapsed since receiving the indication of the second user input.

8. The method of claim 1, further comprising:
detecting, by one or more motion sensors of the computerized watch, movement of the computerized watch;
in response to detecting the movement, generating, by the one or more motion sensors, the motion data, wherein the motion data is indicative of the movement of the computerized watch.

9. The method of claim 1, wherein determining that the user is viewing the display of the computing device further comprises:
capturing, with a camera of the computerized watch, at least one image including a face of the user; and
determining, based on a position of at least one eye of the user in the at least one image and the motion data, that the user is viewing the display device of the computerized watch.

10. The method of claim 1, wherein the event is one or more of a calendar event, an incoming communication, a system notification, or a current activity of the user.

11. The method of claim 1, further comprising:
determining, by the computerized watch, that a portion of information for the event includes important information,
wherein the first information for the event includes the important information.

12. The method of claim 1, wherein: the
the event is a first event from a plurality of events,
each event from the plurality of events is associated with a respective virtual card from a plurality of virtual cards,
the third information for the event is included within a first virtual card form the plurality of virtual cards,
the first information is associate with first level of granularity of information for events, the second information is associated with a second level of granularity of information for events, and the third information is associated with a third level of granularity of information for events, and
the method further comprises:
receiving, by the computerized watch, an indication of first user input to flip to a second virtual card from the plurality of virtual cards, the second virtual card being associated with a second event;
displaying, by the display device, the second virtual card including information for the second event at the third level of granularity;
receiving, by the computerized watch, an indication of second user input to flip to a third virtual card from the plurality of virtual cards, the third virtual card being associated with a third event;
responsive determining, by the computerized watch and based on the first user input and the second user input, that a flip rate exceeds a threshold flip rate, displaying, by the display device, the third virtual card including information for the third event at one of the first level of granularity or the second level of granularity.

13. A computerized watch comprising: one or
one or more processors;
one or more motion sensors that detect movement off the computerized watch and generate, based on the detected movement, motion data;
a display device; and
a computer-readable storage medium that stores at least one module that is operable by the one or more processors to:
output, for display by the display device, first information for an event;
adjust, based on a current activity in which a user of the computerized watch is engaged, one or more of a first threshold amount of time or a second threshold amount of time;
determine, based on the motion data, that a user of the computerized watch is viewing the display device of; and
while the user of the computerized watch is determined to be viewing the display device:
responsive to determining that the user of the computerized watch has viewed the display device for at least the first threshold amount of time, output, for display by the display device, second information for the event, the second information including information associated with the event, wherein at least a portion of the second information is not included in the first information; and
responsive to determining that the user of the computerized watch has viewed the display device for at least the second threshold amount of time that is greater than the first threshold amount of time, output, for display by the display device, third information for the event, wherein at least a portion of the third information is not included in either the first information or the second information.

14. The computerized watch of claim 13, wherein: the event is a travel event, the first information includes at least one of a graphical representation of a mode of transportation or an indication of an amount of time between a current time and a time at which user should depart a current location of the computerized watch,
the second information includes departure location information related to the travel event, and
the third information includes at least one of an indication of an amount of time between the current time and a time at which the travel event is scheduled to commence, and a map with navigation information.

15. The computerized watch of claim 13,
wherein the display device is a presence-sensitive display device, wherein the event is a third event, and
wherein the at least one module is further operable by the one or more processors to, prior to outputting information the first information associated with the third event:
output, for display by the presence-sensitive display device, information associated with a first event;
receive an indication of a first user input detected by the presence-sensitive display device;
output, for display by the presence-sensitive display device, information associated with a second event; and
receive an indication of a second user input detected by the presence-sensitive display device,
wherein the first information for the third event is output in response to receiving the indication of the second user input, and
wherein the second information for the third event is output in response to determining that at least a third threshold amount of time has elapsed since receiving the indication of the second user input.

16. The computerized watch of claim 13, further comprising:
a camera that capture at least one image including a face of the user,
wherein the at least one module is further operable by the one or more processors to determine, based on a position of at least one eye of the user in the at least one image and the motion data, that the user is viewing the display device.

17. The computerized watch of claim 13, wherein: the event is a first event from a plurality of events,
each event from the plurality of events is associated with a respective virtual card from a plurality of virtual cards,
the third information for the event is included within a first virtual card form the plurality of virtual cards,
the first information is associate with first level of granularity of information for events, the second information is associated with a second level of granularity of information for events, and the third information is associated with a third level of granularity of information for events, and
the at least one module is further operable by the one or more processors to:
receive an indication of first user input to flip to a second virtual card from the plurality of virtual cards, the second virtual card being associated with a second event;
output, for display by the display device, the second virtual card including information for the second event at the third level of granularity;
receive an indication of second user input to flip to a third virtual card from the plurality of virtual cards, the third virtual card being associated with a third event; and responsive determining, based on the first user input and the second user input, that a flip rate exceeds a threshold flip rate, output, for display by the display device, the third virtual card including information for the third event at one of the first level of granularity or the second level of granularity.

18. A non-transitory computer-readable storage medium comprising instructions that, when executed, cause one or more processors of a computerized watch to:
output, for display by a display device of the computerized watch, first information for an event;
adjust, based on a current activity in which a user of the computerized watch is engaged, one or more of a first threshold amount of time or a second threshold amount of time;
determine, based on motion data generated by the computerized watch, that a user of the computerized watch is viewing the display device; and
while the user of the computerized watch is determined to be viewing the display device:
responsive to determining that the user of the computerized watch has viewed the display device for at least the first threshold amount of time, output, for display by the display device, second information for the event, the second information including information associated with the event, wherein at least a portion of the second information is not included in the first information; and
responsive to determining that the user of the computerized watch has viewed the display device for at least the second threshold amount of time that is greater than the first threshold amount of time, output, for display by the display device, third information for the event, wherein at least a portion of the third information is not included in either the first information or the second information.

* * * * *